(12) United States Patent
Lan

(10) Patent No.: US 11,399,271 B2
(45) Date of Patent: Jul. 26, 2022

(54) CONVEYING USER EQUIPMENT LOCATION WITH AN EMERGENCY CALL

(71) Applicant: T-Mobile USA, Inc., Bellevue, WA (US)

(72) Inventor: Wei-Ming Lan, Morrisville, NC (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/889,037

(22) Filed: Jun. 1, 2020

(65) Prior Publication Data

US 2021/0377715 A1    Dec. 2, 2021

(51) Int. Cl.
| | |
|---|---|
| H04W 4/90 | (2018.01) |
| H04W 64/00 | (2009.01) |
| H04W 4/02 | (2018.01) |
| G01S 19/48 | (2010.01) |
| H04W 4/029 | (2018.01) |

(52) U.S. Cl.
CPC .............. *H04W 4/90* (2018.02); *G01S 19/48* (2013.01); *H04W 4/027* (2013.01); *H04W 4/029* (2018.02); *H04W 64/006* (2013.01)

(58) Field of Classification Search
CPC ....... H04W 4/90; H04W 4/029; H04W 4/027; H04W 64/006; G01S 19/45
See application file for complete search history.

(56) References Cited

U.S. PATENT DOCUMENTS

| | | | |
|---|---|---|---|
| 7,702,370 B2 * | 4/2010 | Persico | G01S 5/0263 455/574 |
| 8,046,169 B2 | 10/2011 | Mazlum et al. | |
| 9,361,858 B2 * | 6/2016 | Oda | G06T 11/60 |
| 9,374,673 B2 | 6/2016 | Mendelson | |
| 9,568,585 B2 | 2/2017 | Smith et al. | |
| 9,635,534 B2 | 4/2017 | Maier et al. | |
| 9,961,507 B1 | 5/2018 | Mendelson | |
| 2010/0323715 A1 * | 12/2010 | Winters | G01S 5/0294 455/456.1 |
| 2011/0068981 A1 | 3/2011 | Marks et al. | |
| 2013/0091288 A1 | 4/2013 | Shalunovet al. | |
| 2014/0368382 A1 | 12/2014 | Vartanian et al. | |
| 2015/0334545 A1 | 11/2015 | Maier et al. | |
| 2016/0249193 A1 | 8/2016 | Edge | |
| 2016/0295464 A1 | 10/2016 | Barkan | |
| 2017/0171754 A1 | 6/2017 | South et al. | |
| 2017/0255966 A1 * | 9/2017 | Khoury | H04L 67/20 |
| 2018/0054721 A1 * | 2/2018 | Choe | H04W 4/02 |
| 2019/0222993 A1 * | 7/2019 | Maheshwari | H04W 4/023 |

(Continued)

*Primary Examiner* — Muthuswamy G Manoharan
(74) *Attorney, Agent, or Firm* — Summit Patents PC

(57) ABSTRACT

A system for appending an emergency call (e.g., E911) with a location is described herein. The system appends the emergency call to a public safety answering point (PSAP) with a location, including an amended or up-to-the-minute location, from which the emergency call occurred. A user equipment, which places the emergency call, includes cache memory. The location is stored in or retained in the cache memory. The UE, upon recognizing the "911" string for the emergency call, retrieves the location from the UE and appends the call with the location. A location module is used to determine the location of UE. A movement module determines UE movement, including direction, speed, acceleration, and the like. The location of the UE can be amended based on the movement of the UE.

18 Claims, 3 Drawing Sheets

(56) References Cited

U.S. PATENT DOCUMENTS

| | | |
|---|---|---|
| 2019/0230476 A1* | 7/2019 | Qi .......................... G06F 3/048 |
| 2019/0373464 A1 | 12/2019 | Chari et al. |
| 2020/0064491 A1* | 2/2020 | Lau ....................... G01C 21/20 |
| 2020/0145920 A1 | 5/2020 | Shen et al. |
| 2020/0252781 A1 | 8/2020 | Edge |

* cited by examiner

CONVEYING USER EQUIPMENT LOCATION WITH AN EMERGENCY CALL

BACKGROUND

Wired phone lines (or landlines) used to dominate the telecommunications industry. Determining a location of the landline associated with an emergency call was straightforward since the landline was registered to a fixed physical location. The emergency service could look-up the location of the landline, such as with an ANI (Automatic Number Identification) and ALI (Automatic Location Identification) system or a comparable system. However, as mobile devices have become more ubiquitous, landlines have essentially become obsolete.

Providing a location of the mobile device at the time an emergency service is requested is more complicated than matching an address to which the mobile device is registered because, by its very nature, the mobile device physically moves around, such as moving with its user.

Timely giving location information of a user requesting an emergency service can be the difference between a minor inconvenience and a major catastrophe. When an incorrect or inaccurate location is provided, the emergency service must search for the proper location, which can delay the requested or needed help and potentially cause the requester of the emergency service or others to suffer harm. However, providing the proper location allows the emergency service to efficiently head directly to the physical location of the incident requiring the emergency service. The time delays caused by emergency services needing to search for the location of the incident increase the risk and decrease the safety of the incident for the affected person(s) or situation.

What is needed is a telecommunications network for providing a more accurate location of a user equipment for deployment of emergency services. What is further needed is a telecommunications network for reducing the time in which a location of a user equipment is provided for deployment of emergency services. What is further needed is a telecommunication network for determining the location of the user equipment more efficiently.

DETAILED DESCRIPTION

A system for appending an emergency call (e.g., E911 call) with a location is described herein. To ensure a location of a user equipment (UE) is provided to an emergency service in a reduced amount of time (i.e., quicker or less time), the UE can store the location in memory and amend the location based on rate of movement, direction of movement, or both. The location, for example, can therefore be more immediately available for transmission. Furthermore, to ensure the emergency service can properly locate a user requesting or requiring the emergency service, a location, including a current location or current location based on last known location, of the UE can be provided to the emergency service.

The system appends the emergency call to a public safety answering point (PSAP) with a location, including current location or current location based on last known location, of the UE used to make the emergency call. A user places the emergency call, which triggers an input prompt for the UE to initiate a protocol that generates an instruction eventually transmitted to a public safety answering point. The instruction can include the location information. The UE includes cache memory. The location is stored in or retained in the cache memory. The UE, upon recognizing the "911" string for the emergency call, retrieves the location from the UE and appends the call with the location.

A location module (e.g., assisted global positioning system (aGPS), Wi-Fi, assisted global navigation satellite system (aGNSS), a hybrid positioning system, the like, or combinations or multiples thereof) can be used to determine the location of UE. A movement module determines UE movement, including direction, speed, acceleration, and the like. The location of the UE can be amended based on the movement of the UE. In one example, the movement module determines that the location of the user of the UE, while holding or using the UE, is fixed (i.e., does not change), whether the user of the UE is stationary (i.e., not moving) or moving (e,g., walking around a room, or the like) The cached location is, therefore, not amended or is amended every few minutes or hours. In another example, the movement module determines that the user of the UE, while holding or using the UE, is mobile within a confined area. The cached location is, therefore, amended every minute. In yet another example, the movement module determines that the user of the UE, while holding or using the UE, is walking or running. The cached location is, therefore, amended every 10-20 seconds. In yet another example, the movement module determines that the user of the UE, while holding or using the UE, is moving at a high speed, such as in a car or on a bus or train. The cached location is, therefore, amended every 5 seconds.

Figure 1:
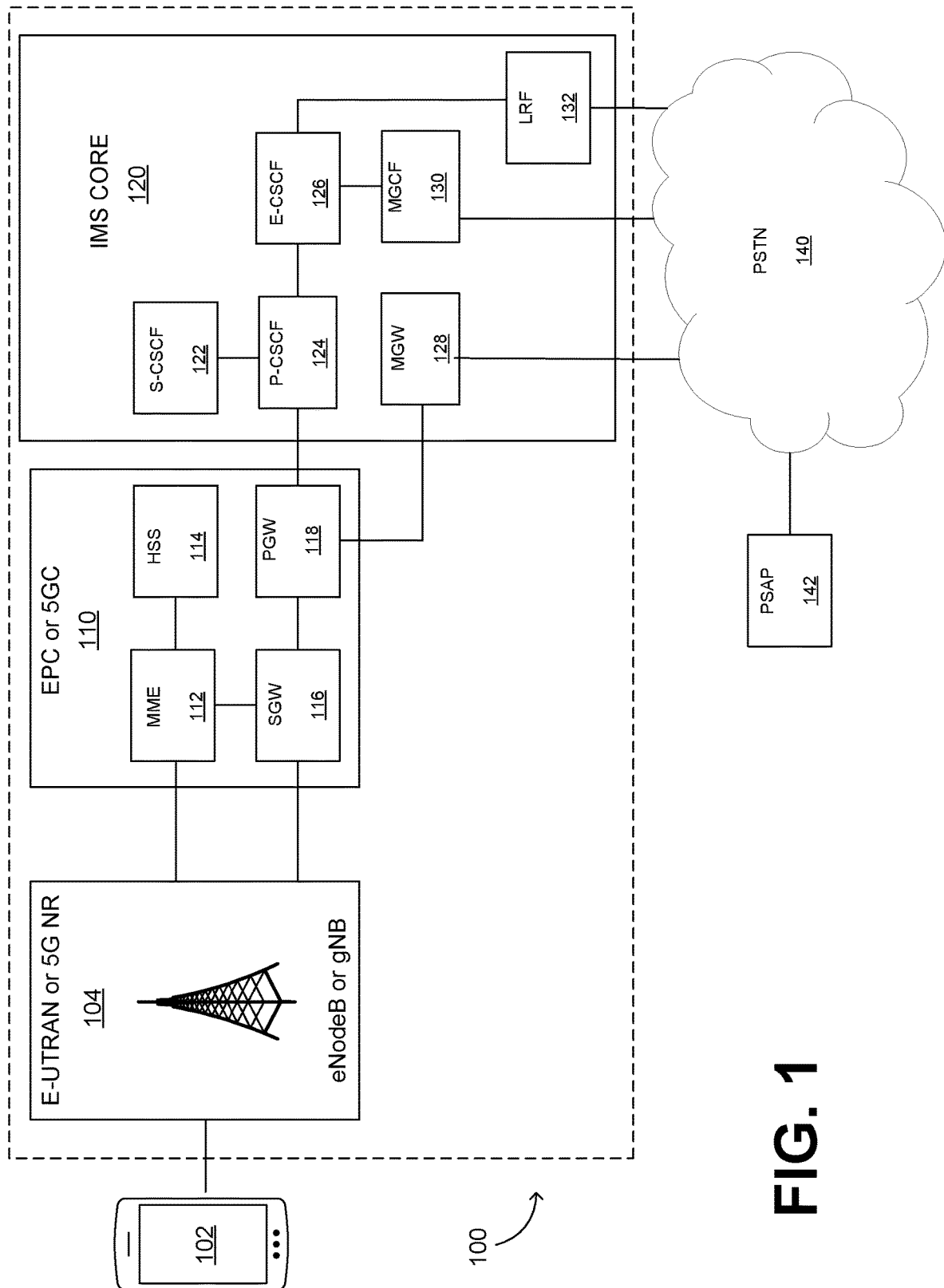
FIG. 1 illustrates an example network.

FIG. 1 shows a system including a telecommunications network 100. The telecommunications network 100 includes an access network (e.g., E-UTRAN; VoLTE; 5G NR; VoNR) 104 which includes a network site (e.g., eNodeB or gNB). The access network 104 transmits data, including data packets, between user equipment (UE) 102 and a public switched telephone network (PSTN) 140, such as through a data core 110 and IP multimedia subsystem (IMS) core 120. The network site controls the UE 102 within a given cell of the telecommunications network 100. For example, the network site sends and receives radio transmission(s) to the UE 102 using analogue and digital signal processing functions of an access network air interface. The network site also controls low-level operations of the UE 102 via signaling messages, such as handover commands.

The network site includes a UE communication module programmed to communicate with the UE 102 (i.e., transmit a signal or data). The UE communication module can be an interface, such as a UU or e-Uu interface. The network site also includes a data core communication module programmed to communicate (i.e., transmit a signal or data) with the data core 110. The data core communication module can be an interface, such as a S1, GTP, or NG interface.

The UE 102 is any device used by an end-user for communication or data transmission purposes, including, without limitation, a mobile phone, a smartphone, a tablet, a personal digital assistant, a laptop with mobile connectivity, or the like.

The data core 110 is an IP-based core network infrastructure that provides packet data services, such as to support the convergence of licensed and unlicensed radio technologies (e.g., an evolved packet core (EPC) or 5G Core). The data core 110 can be defined around various paradigms, including mobility, policy management, and security. The four elements of the data core include a home subscriber server (HSS) 114, a mobility management entity (MME) 112, a serving gateway (SGW) 116, and a packet data network gateway (PGW) 118.

The MME 112 pages and authenticates the UE 102. The MME 112 can retain location information at the tracker level for each UE 102 and selects the appropriate gateway during the initial registration process. The MME 112 can connect to the network site via a S1-MME interface and to the SGW 116 via a S11 interface.

The SGW 116 forwards and routes packets (e.g., data packets) to and from the network site and the PGW 118. The SGW 116 connects to the network site via a S1-M and to the PGW 118 via a S5/S8 interface.

The PGW 118 provides connectivity between the UE 102 and external data packet networks, including the IMS 120. The PGW 118 can be connected to a proxy call session control function (P-CSCF) 124 of the IMS 120 via a SGi interface. The PGW 118 can also be connected to a media gateway (MGW) 128 of the IMS 120 via a SGi interface.

The HSS 114 of the data core 110, which is in communication with the MME 112 via a S6 interface, is a database that contains user-related information and subscriber-related information.

The IMS 120, which is an architectural framework for delivering IP multimedia services. The IMS 120 also handles session management and media control. The IMS 120 can communicate with a secondary network, such as the PSTN 140, via a gateway or function. The IMS 120 can include a serving call state control function (S-CSCF) 122, emergency call state control function (E-CSCF) 126, the P-CSCF 124, the MGW 128, and a media gateway control function (MGCF) 130.

The P-CSCF 124 can connect to the S-CSCF 122 via a Mw interface, to the E-CSCF 126 via a Mw interface, and to the PGW 118 via a Gm interface. The P-CSCF 124 can handle registration requests with an emergency public user identifier, detect and prioritize an emergency session, prevent the assertion of an emergency public user identifier in non-emergency requests, query IP connectivity access network, select an E-CSCF 126 in the network to handle the emergency session request, the like, or combinations or multiples thereof.

The S-CSCF 122 can determine the duration of the registration for a received emergency registration. The S-CSCF 122 can also download or request a user profile.

The E-CSCF 126 can receive an emergency session establishment request from the P-CSCF 124, request a location retrieval function (LRF) 132 to retrieve location information (including a validation request), determine or query the LRF 132 for proper routing information or PSAP destination, route emergency session establishment requests to an appropriate destination, forward session initiation protocol requests including UE location information to a PSAP 142, the like, or combinations or multiples thereof.

The MGCF 130 facilitates call control between the IMS 120 and the PSTN 140. The MGCF 130 can connect to the E-CSCF 126 via a Mw interface.

The MGW 128 can translate or convert media streams between dissimilar telecommunications networks.

The LRF 132 can connect to the E-CSCF 126 via an Mi interface and to the PSTN 140 via a Le interface. The LRF 132 can retrieve location information for the UE 102 (including interacting with one or more location servers), can route information, the like, or combinations or multiples thereof.

The PSAP 142 is a call center where emergency calls (e.g., police, fire, ambulance) initiated by the UE 102 are received (i.e., where the call terminates). The PSTN 140 can route or direct, whether selectively or otherwise, a call to the PSAP 142, such a as via router or selective router. The PSAP 142 can initiate the emergency service response, such as by dispatching the emergency service provider.

Figure 2:
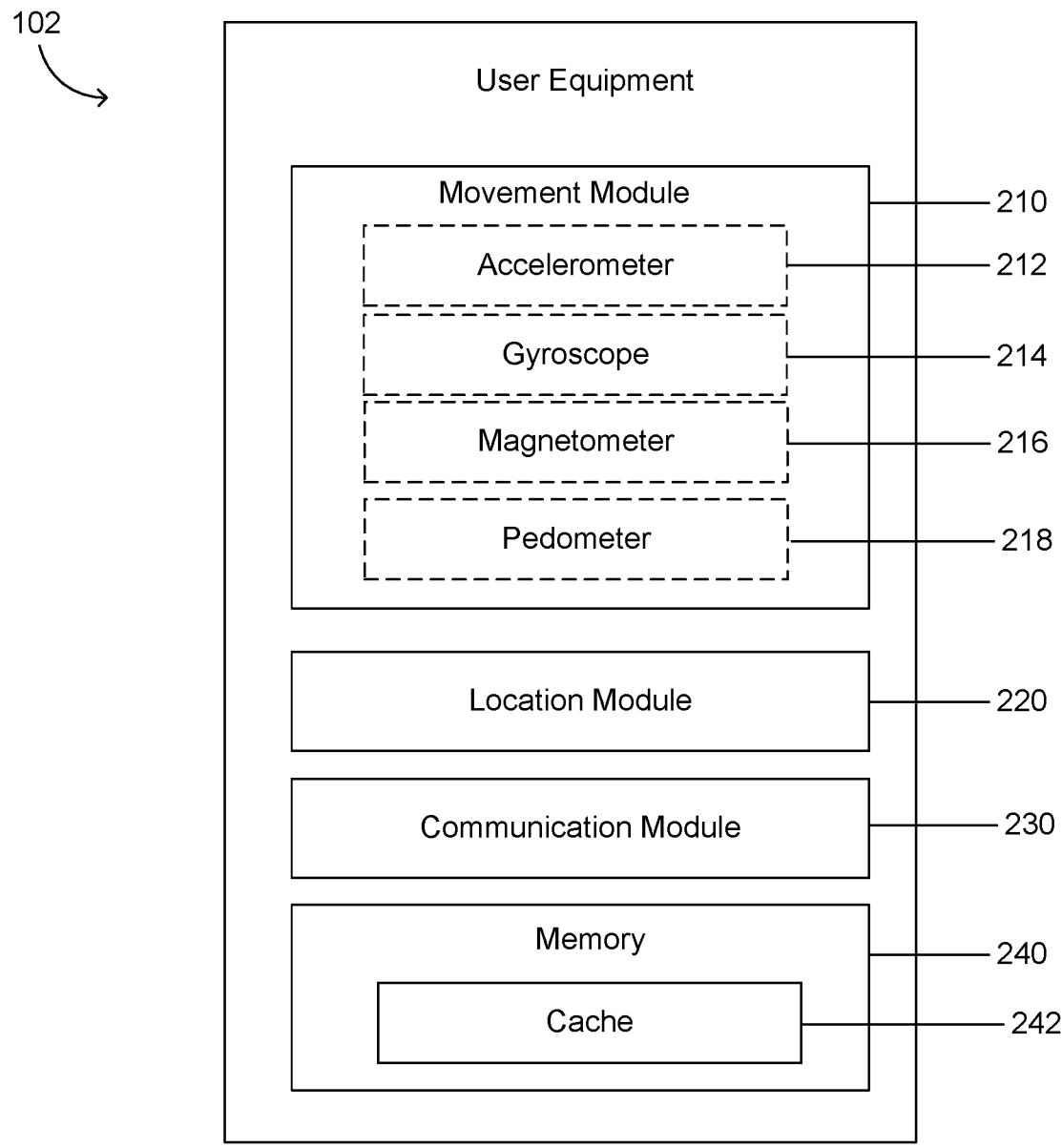
FIG. 2 illustrates a block diagram of an example user equipment.

FIG. 2 shows a block diagram of the UE 102. The UE 102 includes a location module 220 (e.g., aGPS, Wi-Fi, aGNSS, a hybrid positioning system, the like, or combinations or multiples thereof) which is programmed to determine and track the location of the UE 102 at any given time. The location can be latitude and longitude.

The UE 102 also includes a communication module 230 to communicate with the network site, such as via a Uu or e-Uu interface. The communication module 230 can output or transmit the location via a message.

The UE 102 can also include a movement module 210 to determine the rate, direction, or both of the movement of the UE 102. The movement module 210 can include a magnetometer 216, a gyroscope 214, an accelerometer 212, a pedometer 218, the like, or combinations or multiples thereof. The magnetometer 216 measures magnetic fields and can be used as a compass (i.e. to determine orientation), due, at least in part, to the earth's magnetic field. The accelerometer 212, which measures one or more accelerations, can measure a change in velocity since the acceleration is the first time derivative of the velocity, and a change in position, such as by integrating the acceleration signal. The gyroscope 214 measures either changes in orientation or rotational velocity. The pedometer 218 counts the number of steps taken by a user of the UE 102.

The UE 102 also includes memory 240 to store information, whether temporarily or permanently. One type of memory 240 is cache memory 242. The cache memory 242 is temporary storage which is more readily available or more efficiently retrievable than one or more other types of memory 240. The cache memory 242 can be chip-based.

Figure 3:
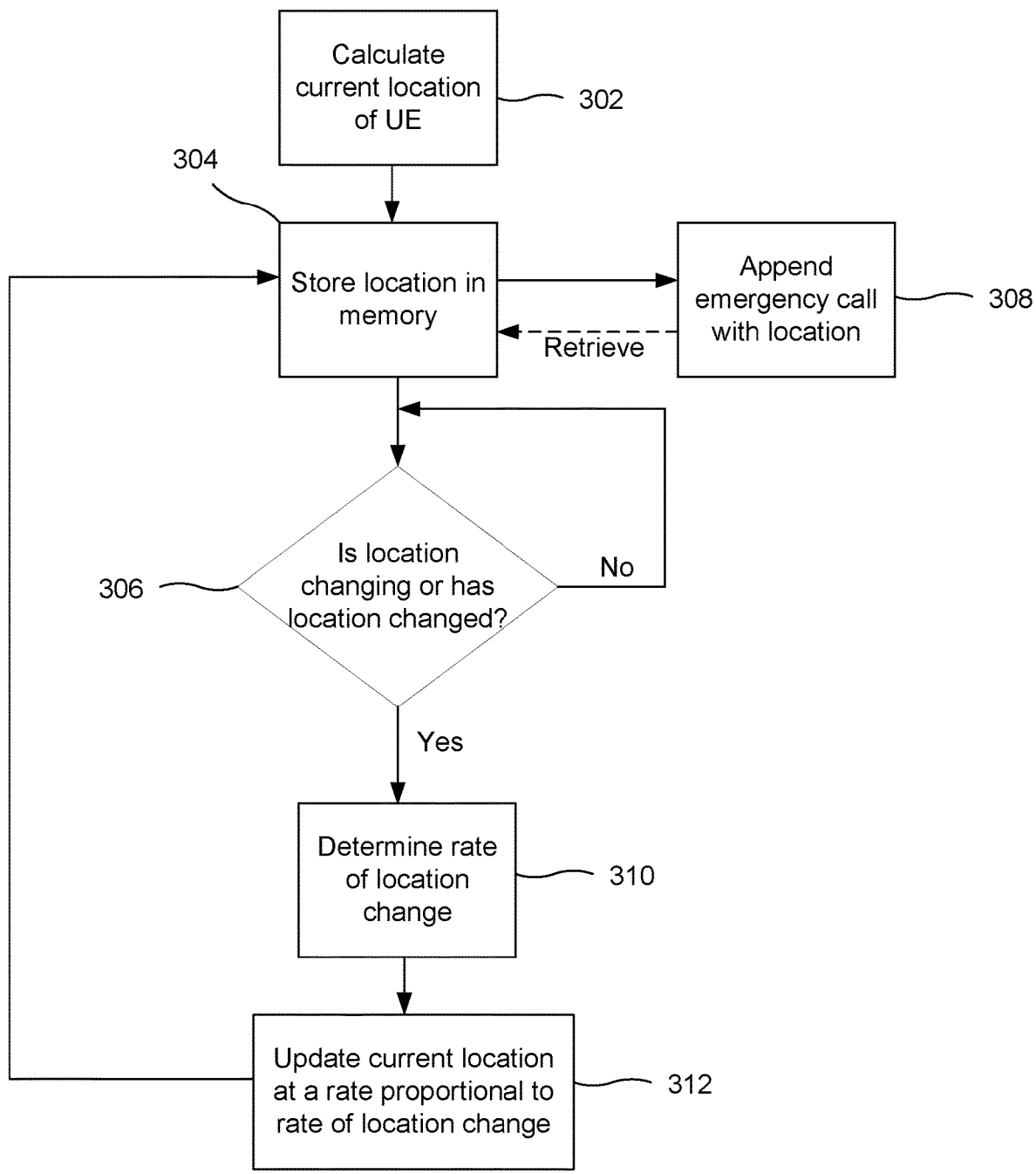
FIG. 3 illustrates a flowchart for an example process for appending a location to an emergency call.

FIG. 3 shows a flowchart for a process for appending an emergency call with a location. In one example, the time to provide the location to the emergency services can be reduced (i.e., provided quicker, provided in less time, or the like), such as by storing the location memory and amending the location based on rate of movement, direction of movement, or both. In another example, a more accurate location can be provided to emergency systems by amending the location as frequently as needed.

At 302, an initial location is determined or calculated, such as by aGPS, Wi-Fi, aGNSS, a hybrid positioning system, the like, or combinations or multiples thereof. At 304, the initial location is stored within the memory 240 of the UE 102, such as the cache memory 242. At 306, is the location of the UE 102 changing or has the location of the UE 102 changed since the last time a location has been stored. The movement module 210, as shown in FIG. 2, can determine whether or not the location of the UE 102 is changing or has changed since the last time the location has been stored.

At 308, the location of the UE 102 (i.e., current location) is transmitted to the PSAP 142. The emergency call is appended with the location of the UE 102. In the telecommunications network 100, as shown in FIG. 1, the emergency number or string (e.g., 911) is input into the UE 102, such as with a device input (e.g., touchscreen, keypad, external entry device, or the like). The emergency number or string is recognized by the UE 102 and a prioritized communication channel to an emergency access point name is established. In doing so, a default migration path or tunnel is provided for signaling, such that a signaling pathway to initiate a communication session is established. An instruction or request is transmitted from the UE 102 via the access network 104 to the SGW 116 then to the PGW 118. The instruction or request is then transmitted from the PGW 118 to the P-CSCF 124. The P-CSCF 124 detects an emergency request uniform resource identifier (R-URI) from the instruction or request and the SIP INVITE to the E-CSCF 126. The E-CSCF 126, in response to the instruction or request, queries the LRF 132 for the UE 102 location and routes the UE location to the PSAP 142 via the MGCF 130 and the PSTN 140. Alternatively, or additionally, the PSAP 142 can query the LRF 132 for the UE location. Alternatively, or additionally, the LRF 132 can query the UE 102 for the UE location. The S-CSCF 122 also receives an emergency registration via the instruction or request.

A message to the PSAP 142 can also be generated by the UE 102 upon receiving the emergency number or string.

Furthermore, at 308, the location can be retrieved from the memory, such as when the UE is queried for the location by one or more components of the telecommunications network.

Additionally, a user plane is provided for media, such that a media pathway for a voice service is established. A voice signal is transmitted from the UE 102 via the access network 104 to the SGW 116 then to the PGW 118. The voice signal is then transmitted from the PGW 118 to the MGW 128. The voice signal is routed from the MGW 132 to the PSAP 142 via the PSTN 140.

In other words, the UE location can be transmitted with the instruction or request to initiate the communication session or in response to a data pass. The voice signal can be transmitted on an established user plane separate from the instruction or request pathway.

Returning to FIG. 3, if the location of the UE 102 is changing or has changed since the last time the location was stored, the location of the UE 102 is amended and stored to the current location. At 310, the movement module 210 calculates the rate of change of the UE location.

The movement module 210, as shown in FIG. 2, can determine whether or not the location of the UE 102 is changing or has changed since the last time the location has been stored. For example, the accelerometer 212 can determine the speed with which the UE location is changing. The accelerometer 212 can also determine the change in location, whether on its own or with another component of the movement module 210, such as the magnetometer. As another example, the pedometer 218 can also determine the change in UE location based on calculated or detected movement.

If the location of the UE 102 is not changing or has not changed since the last time the location was stored or confirmed (i.e., such as by determining movement of the UE by the movement module), the UE does not amend the location. In other words, the UE if any movement is detected by the movement module and determines that an amended location is not required as the UE location has not changed or is not changing.

At 312, the UE location is amended at a rate proportional to the rate of location change, such as with aGPS, Wi-Fi, aGNSS, a hybrid positioning system, the like, or combinations or multiples thereof, thereby providing the current location.

For example, the movement module 210 detects that the UE 102 is moving at a first speed or range of speeds, such as within a confined or small area (e.g., an office, a house, a shopping mall, a gym, or the like). The location module 220 amends or re-calculates the UE location at a first frequency. As another example, the movement module 210 detects that the UE 102 is moving at a second speed or range of speeds, such as, running or hiking. The location module 220 amends or re-calculates the UE location at a second frequency. As yet another example, the movement module 210 detects that the UE 102 is moving at a third speed or range of speeds, such as in a car, on a train or bus, or the like. The location module 220 amends or re-calculates the UE location at a third frequency. The first speed or range of speeds is less than the second speed or range of speeds which is less than the third speed or range of speeds. The first frequency is less than the second frequency which is less than the third frequency. For example, the first frequency can be at least every minute (i.e., 60 times per hour), the second frequency can be every 10-30 seconds (i.e., 120-360 times per hour), and the third frequency can be every 1-5 seconds (i.e., 720-3600 times per hour).

Determining rate of location change and amending the locating can be repeated any number of times with the amended location being stored in the memory 240 each pass or time, as shown at 304.

In one example, the emergency call can be appended with the most recent UE location, even if the UE 102 is still moving (i.e., when the emergency call occurs between amends). The current location of the UE 102 can be transmitted to the PSAP 142, such as upon amending the location of the UE 102.

In another example, the emergency call can be appended with an anticipated UE location as determined by the most recent UE location and the movement information calculated by the movement module 210, including speed and direction of movement.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A user equipment (UE) for conveying an emergency location, the UE, comprising:
    a UE memory;
    a UE processor configured to:
        detect an input emergency string to the UE;
        in response to detecting the input emergency string, acquire an initial location of the UE by a location module,
        calculate a rate of movement and a direction of movement of the UE,
        determine a current location of the UE relative to the initial location based on calculating the rate of movement and the direction of movement, the current location determined at a frequency rate that re-calculates the current location at designated time intervals timed apart according to the frequency rate, and the frequency rate is determined based on the calculated rate of movement and the calculated direction of movement of the UE calculated after the detected input emergency string,
        determine current location data that includes the current location of the UE, the current location data to be stored in the UE memory,
        upon determination of the current location data, retrieve the current location from the UE memory in response to the input emergency string into the UE via a user input component, and
        generate, in response to retrieving the current location, a message that includes:
            the current location retrieved from the UE memory,
            an emergency request resource identifier; and
            an instruction to further transmit a message to a public safety answer point (PSAP) that includes the emergency request resource identifier and the current location; and
    an output configured to transmit the message from the UE processor to a network site of a telecommunications network.

2. The UE of claim 1, wherein the message is generated by the UE in response to one or more queries by a public safety access point (PSAP), an emergency call state control function (E-CSCF) or a location retrieval function (LRF).

3. The UE of claim 1, wherein the current location includes latitude and longitude.

4. The UE of claim 1, wherein the UE memory is cache memory.

5. The UE of claim 1, wherein a change in the rate of movement is proportional to a change in the frequency rate.

6. The UE of claim 1, wherein the UE processor is further configured to determine the current location of the UE has not changed from the initial location.

7. The UE of claim 1, wherein the UE processor is further configured to cause the current location data associated with the current location to be stored in the UE memory every time the UE processor re-calculates the current location at the designated time intervals.

8. The UE of claim 1, wherein the location module includes an assisted global positioning system, Wi-Fi, an assisted global navigation satellite system, a hybrid positioning system, or combinations or multiples thereof.

9. The UE of claim 1, wherein the output further includes a communication module configured to transmit the message from the UE processor to the network site and receive a message from the network site.

10. The UE of claim 1, wherein the message is generated in response to the input emergency string received via a user input component.

11. The UE of claim 1, wherein the current location is determined by the location module, a movement module of the UE, or both.

12. The UE of claim 11, wherein the movement module includes a magnetometer, a gyroscope, an accelerometer, a pedometer, or combinations or multiples thereof.

13. A method for transmitting an emergency location of a user equipment (UE) to a public safety answering point (PSAP), the method comprising:
    detecting an input emergency string to the UE;
    in response to detecting the input emergency string, acquiring an initial location of the UE by the location module,
    calculating a movement characteristic of the UE, the movement characteristic including a rate of movement of the UE and a direction of the UE,
    determining a current location of the UE relative to the initial location based on the calculated movement characteristic, the current location determined at a frequency rate that re-calculates the current location at designated time intervals timed apart according to the frequency rate, and the frequency rate is determined based on the calculated movement characteristic of the UE calculated after the detected input emergency string,
    determining current location data that includes the current location of the UE, the current location data to be stored in a UE memory,
    upon determination of the current location data, retrieving the current location from the UE memory of the UE in response to the input emergency string to the UE, and
    generating, in response to retrieving the current location, a message that includes:
        the current location;
        an emergency request resource identifier; and
        an instruction to further transmit a message to a public safety answer point (PSAP) that includes the emergency request resource identifier and the current location; and
    outputting the message with the current location to a network site of a telecommunications network.

14. The method of claim 13, wherein the current location is determined by the location module, a movement module of the UE, or both.

15. The method of claim 13, wherein the message is generated by the UE in response to one or more queries by the PSAP, an emergency call state control function (E-CSCF), a location retrieval function (LRF), or combinations thereof.

16. The method of claim 13, wherein a change in the rate of movement is proportional to a change in the frequency rate.

17. The method of claim 13, wherein the location module comprises an assisted global positioning system, Wi-Fi, an assisted global navigation satellite system, a hybrid positioning system, or combinations or multiples thereof.

18. The UE of claim 1, wherein the user input component is tactile.

\* \* \* \* \*